(12) United States Patent  
Barta (10) Patent No.: US 8,280,616 B2
(45) Date of Patent: Oct. 2, 2012

(54) REMOTE STARTER WITH UNIVERSAL BYPASS MODULE

(75) Inventor: Brett Barta, Hudson, OH (US)

(73) Assignee: Access 2 Communications, Inc., Steubenville, OH (US)

( * ) Notice: Subject to any disclaimer, the term of this patent is extended or adjusted under 35 U.S.C. 154(b) by 110 days.

(21) Appl. No.: 12/850,735

(22) Filed: Aug. 5, 2010

(65) Prior Publication Data

US 2012/0031363 A1 Feb. 9, 2012

(51) Int. Cl.
*F02N 11/08* (2006.01)
(52) U.S. Cl. .................... 701/113; 123/179.2
(58) Field of Classification Search .......... 123/179.2, 123/179.5, 179.28; 701/113; 307/10.3, 10.6; 340/426.3, 426.35
See application file for complete search history.

(56) References Cited

U.S. PATENT DOCUMENTS

| | | |
|---|---|---|
| 1,171,055 A | 2/1916 | Kettering |
| 3,720,284 A | 3/1973 | Myers |
| 4,148,372 A | 4/1979 | Schroeder |
| 4,366,466 A | 12/1982 | Lutz |
| 4,598,209 A | 7/1986 | Garlinghouse |
| 5,156,032 A | 10/1992 | Edgar |
| 5,184,584 A | 2/1993 | Cantrell |
| 5,254,842 A | 10/1993 | Posner et al. |
| 5,519,376 A | 5/1996 | Iijima |
| 5,612,578 A | 3/1997 | Drew |
| 5,677,664 A | 10/1997 | Sawinski |
| 5,686,883 A | 11/1997 | Mutoh et al. |
| 5,742,137 A | 4/1998 | Bratton et al. |
| 5,942,988 A | 8/1999 | Snyder et al. |
| 6,101,428 A | 8/2000 | Snyder |
| 6,144,112 A | 11/2000 | Gilmore |
| 6,259,169 B1 | 7/2001 | Cadieux et al. |
| 6,396,388 B1 | 5/2002 | Dong |
| 6,452,772 B1 | 9/2002 | Snyder |
| 6,700,220 B2 | 3/2004 | Bayeur et al. |
| 6,781,507 B1 | 8/2004 | Birchfield et al. |
| 7,031,826 B2 * | 4/2006 | Flick .......................... 701/113 |
| 7,046,126 B2 * | 5/2006 | Flick .................... 340/426.36 |
| 7,068,153 B2 * | 6/2006 | Flick .................... 340/426.36 |
| 7,205,679 B2 * | 4/2007 | Flick .......................... 307/10.3 |
| 7,224,083 B2 * | 5/2007 | Flick .......................... 307/10.6 |
| 7,369,936 B2 * | 5/2008 | Flick .......................... 701/113 |
| 7,483,783 B2 | 1/2009 | Dery |
| 7,514,811 B2 | 4/2009 | Matsubara et al. |

(Continued)

OTHER PUBLICATIONS

Commando Vehicle Security Instruction Manual, 7 pages.

*Primary Examiner* — Hai Huynh
(74) *Attorney, Agent, or Firm* — Brouse McDowell; Heather M. Barnes; Michael G. Craig (57) ABSTRACT

Disclosed is a remote starter system for remotely starting an engine of a vehicle. The remote starter system may comprise an integrated universal bypass module that allows the remote starter system to be utilized with vehicles equipped with a passive anti-theft system such as a transponder-based vehicle security system or a resistance-based vehicle security system. Alternatively, the remote starter system may comprise a kit comprising a remote starter system for remotely starting an engine of a vehicle and a universal bypass module that allows the remote starter system to be utilized with vehicles equipped with an anti-theft system such as a transponder-based vehicle security system or a resistance-based vehicle security system.

20 Claims, 6 Drawing Sheets

U.S. PATENT DOCUMENTS

| | | |
|---|---|---|
| 7,542,827 B2 | 6/2009 | Gerard et al. |
| 2004/0135435 A1 | 7/2004 | Nelson |
| 2006/0192650 A1 | 8/2006 | Shinada |
| 2007/0016342 A1 | 1/2007 | Allen et al. |
| 2007/0228827 A1 | 10/2007 | Aubertin et al. |
| 2008/0042801 A1 | 2/2008 | Nelson |
| 2008/0074234 A1 | 3/2008 | Nelson |
| 2009/0021344 A1 | 1/2009 | Proefke et al. |

* cited by examiner

REMOTE STARTER WITH UNIVERSAL BYPASS MODULE

BACKGROUND

A. Field of Invention

This invention pertains to the art of methods and apparatuses of remote vehicle engine starters and even more particularly, to the art of methods and apparatuses of remote vehicle engine starters having an integrated universal bypass module.

B. Description of the Related Art

Remote vehicle starter systems commonly utilize a portable transmitter, keypad, or switch to allow an operator to start the vehicle prior to entering the vehicle or inserting the mechanical ignition key into the vehicle ignition. Remote starter systems allow operators to environmentally condition the vehicle. Remote starter systems allow the vehicle to be started, and thereby a heater or air conditioner in the vehicle to be turned on, prior to the operator entering the vehicle. After entering the vehicle, the operator can place the mechanical ignition key into the vehicle ignition, turn the ignition to the "ON" or "RUN" position, and operate the vehicle as if the vehicle was started by the operator utilizing the mechanical ignition key.

It is known for vehicle manufacturers to equip vehicles with anti-theft systems or vehicle alarms as original manufacturer equipment (OEM). Commonly, these OEM vehicle alarms prevent the vehicle from being started unless the vehicle alarm detects that the operator has taken some specific step or action, such as, for example, placing an identifiable key into the ignition of the vehicle. There are several different types of vehicle alarm systems currently being utilized by different vehicle manufacturers. However, most vehicle alarm systems fall into one of two different types of vehicle alarm system. A resistance-based vehicle alarm system utilizes one or more resistors embedded in the metal shank of the mechanical ignition key. When inserted into the vehicle ignition, the resistor(s) provide a specific resistance that is detected by the resistance-based vehicle alarm system prior to allowing the vehicle to be started. A transponder-based vehicle alarm system utilizes a transponder positioned within the head portion of the mechanical ignition key. The transponder communicates with the transponder-based vehicle alarm system to indicate that the proper or an authorized key is being utilized to start the vehicle. Even within these two types of vehicle alarm systems, there are several different variations utilized between different vehicle manufacturers.

It is known to utilize a module for bypassing an OEM vehicle alarm system that may be present when installing a remote starter system on a vehicle. The module, commonly referred to as a "bypass module" allows the vehicle operator to "bypass" the vehicle alarm system and allow the operator to remotely start the vehicle without requiring the mechanical key to be inserted into the ignition cylinder. Conventionally, the bypass module is designed to operate with a specific type of vehicle security system utilized by a specific manufacturer or a specific make or model of vehicle. The bypass module is sold separately from the remote starter system thereby allowing a manufacturer to manufacture and sell a single remote starter system that can be utilized with differing types of bypass modules designed to bypass a specific type of vehicle security system.

Although known devices work well for their intended purpose, several disadvantages exist. To accommodate the different types of vehicle security systems, manufacturers of remote starter systems provide multiple types of bypass modules. Operators must separately purchase the correct type of bypass module so that the remote starter system can be utilized with the type of vehicle security system installed on their vehicle. This requires the manufacturing and inventorying of a large number of different bypass modules necessary to ensure that the remote starter system can be utilized with each type of vehicle security system currently provided by vehicle manufacturers. Additionally, conventional remote starter systems and bypass modules require the vehicle operator to (1) recognize that their vehicle is equipped with an anti-theft system; (2) determine the type of anti-theft system that the vehicle is equipped with; (3) purchase the correct type of bypass module separate and apart from the remote starter system; and, (4) correctly install both the remote starter system and the bypass module.

Commonly, after-market remote starter systems are purchased and installed by the vehicle operator and not by the manufacturer or a professional mechanic or technician. Often, the vehicle operator recognizes that a bypass module is needed or that the incorrect type of bypass module has been acquired during the process of installing the remote starter system. To obtain the necessary bypass module, the vehicle operator must stop the process of installing the remote starter and either undo the steps already completed and return the vehicle to its original condition or obtain other means of transportation for traveling to the applicable store or retail establishment selling that particular type of bypass module. Commonly, these events result in the vehicle operator returning the remote starter system and/or incorrect type of bypass module for a refund of the purchase price and the remote starter system not being installed.

It is known for stores or retail establishments selling remote starter systems and bypass modules to limit or otherwise control the amount of shelf space provided to display the products any one manufacturer. For example, a store may utilize a single display unit having four horizontally arranged shelves for displaying and selling remote starters and bypass modules. The store may then allocate the shelf space provided by the four horizontally arranged shelves between a plurality of manufacturers. A manufacturer who produces remote starter systems and several different types of bypass modules may utilize its allocated shelf space to display and sell the remote starter system and only the more common or best-selling types of bypass modules. This arrangement may result in a vehicle operator being unable to conveniently purchase the correct type of bypass module necessary to correctly install the remote starter system.

SUMMARY

According to one embodiment of the invention,

One advantage of this invention is that the remote starter comprises a single unit that can be installed on vehicles without passive security systems, with transponder-based security systems, and with resistance-based security systems.

Another advantage is that the invention eliminates the requirement for the consumer to purchase a separate bypass module and/or determine what type, if any, of security system is installed on their vehicle.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION

Figure 1:
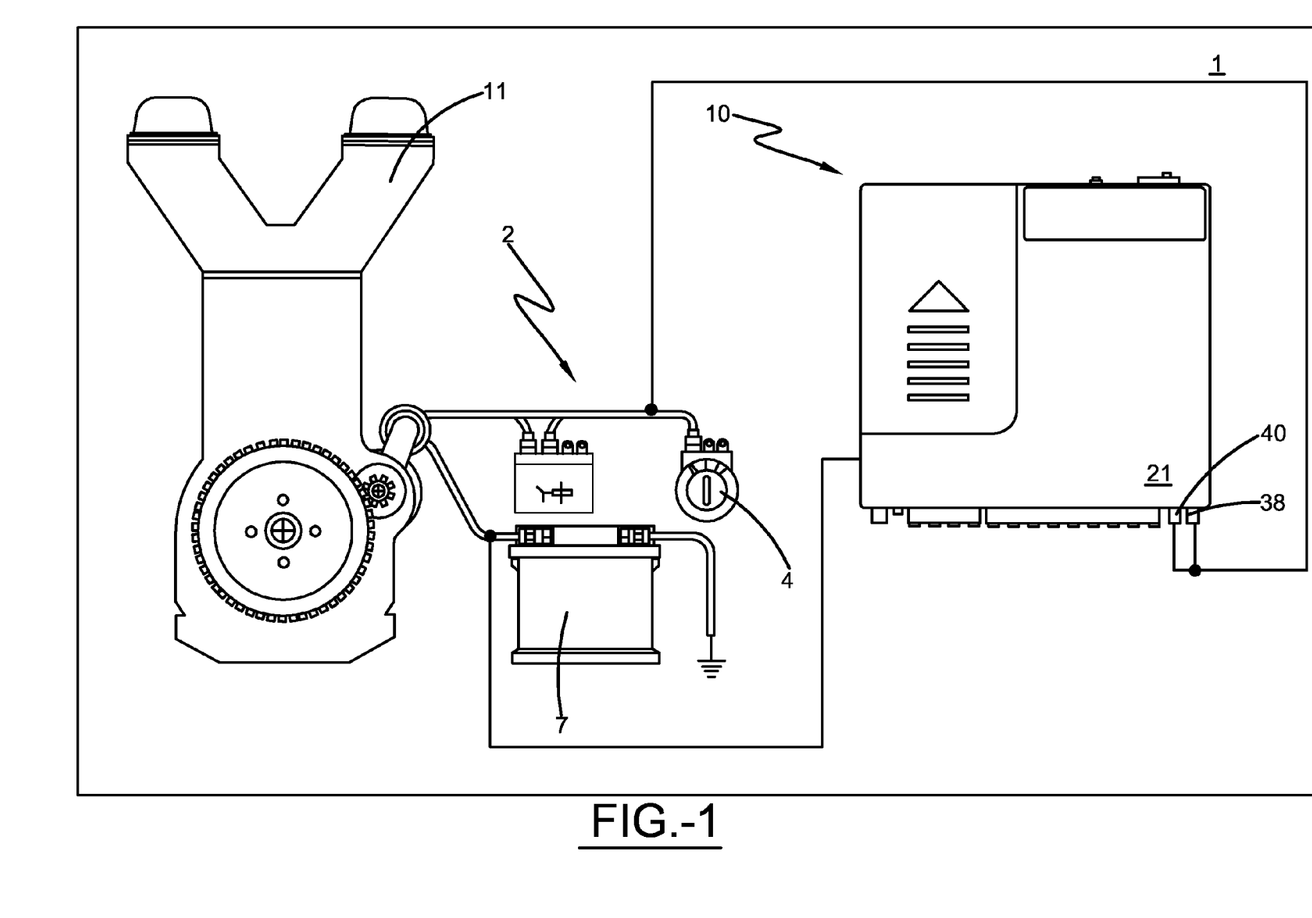
FIG. 1 shows a partial illustrative view of a remote starter system having a universal bypass module operatively connected to a vehicle according to one embodiment of the invention.

Referring now to the drawings wherein the showings are for purposes of illustrating embodiments of the invention only and not for purposes of limiting the same, FIG. 1 shows a remote starter system 10 including a universal bypass module 50 according to one embodiment of the invention. The remote starter system 10 may comprise a system or apparatus for remotely starting an engine; particularly, an internal combustion engine employed in a vehicle such as an automobile, truck, etc. In one embodiment, the remote starter system 10 may comprise an integrated unit contained in a single housing. In another embodiment, the remote starter system 10 may comprise a kit or single retail unit that can be purchased to be utilized with vehicles not having any type of installed vehicle security system, vehicles having a transponder-based vehicle security system, and vehicles having a resistance-based vehicle security system thereby eliminating the need for the user to identify the existence and of vehicle security system prior to purchasing and installing the remote starter system 10.

Figure 2:
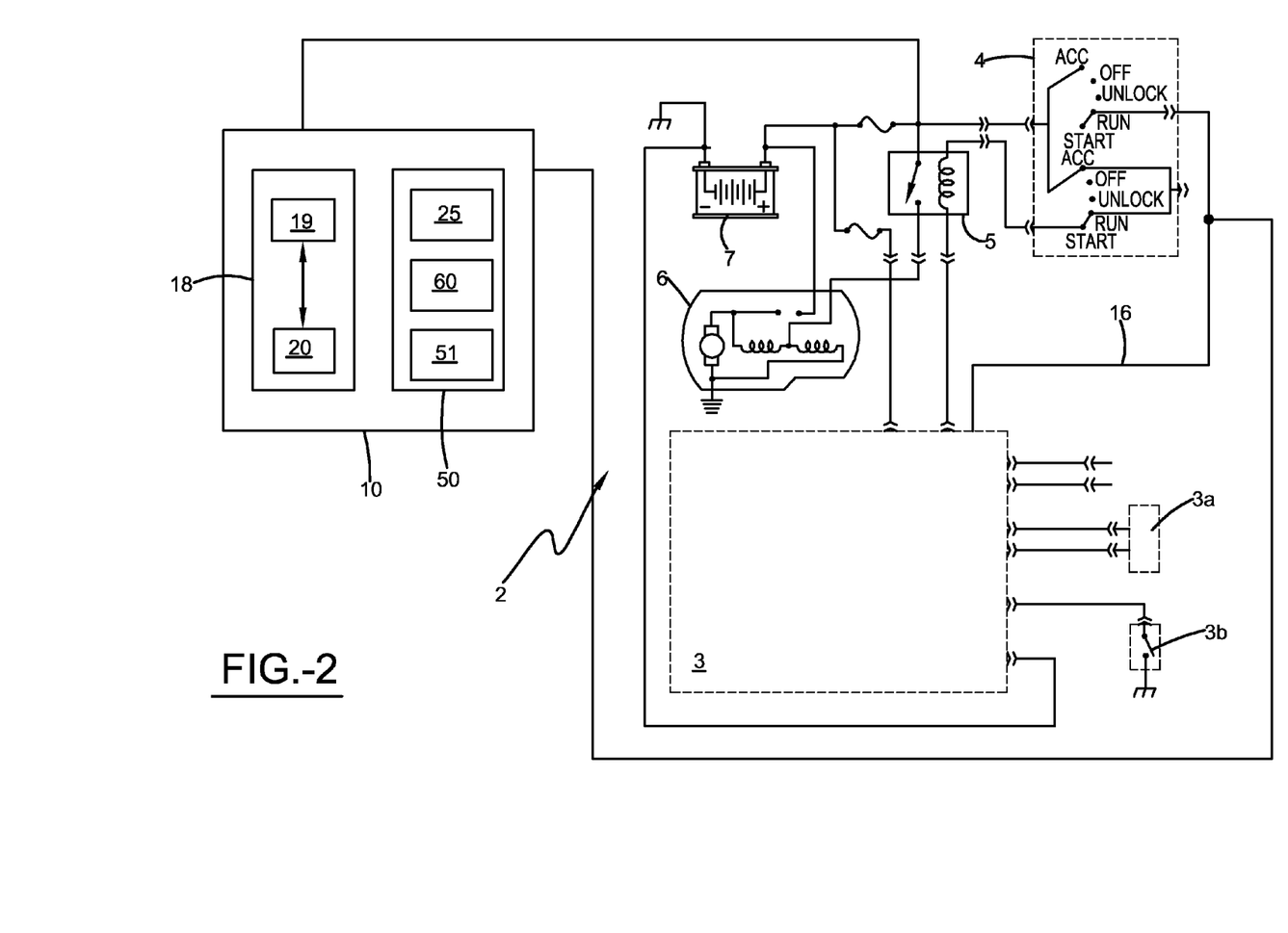
FIG. 2 shows a schematic representation of a remote starter having a universal bypass module according to one embodiment of the invention.
Figure 4:
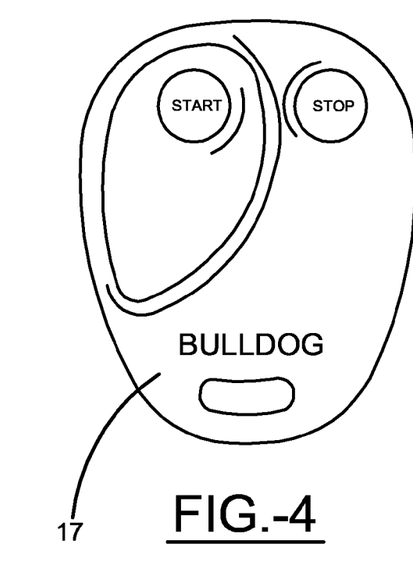
FIG. 4 shows a perspective front view of a remote transmitter according to one embodiment of the invention.

With reference now to FIGS. 1, 2, and 4, the remote starter system 10 may comprise a starter module 18 and a bypass module 50. The starter module 18 may be positioned substantially within a housing 21 and may be adapted to enable the remote starting of the engine 11. The remote starter module 18 may comprise a controller 19 and a receiver 20. The receiver 20 may be adapted to receive radio frequency encoded signals and may be electrically coupled to the controller 19. The controller 19 may be electrically coupled to the starter system 2 and may at least partially cause the engine 11 to be started in response to a START ENGINE signal received by the receiver 20. The controller 19 may comprise a microprocessor or microcontroller suitable for controlling one or more components of the remote starter system 10. The controller 19 may be powered by the battery 7 and/or a back-up or internal battery positioned within the housing 21. In one embodiment, the controller may comprise a microprocessor, and memory (volatile and non-volatile) suitable for storing an executable program or a series of executable commands. In one embodiment, the START ENGINE signal may be transmitted to the receiver 19 via a remote transmitter or actuator 17. The actuator 17 may be remotely located from the engine 11 and may comprise a portable device adapted to selectively transmit radio signals capable of being received by the receiver 19 to start and/or deactivate the engine 11. The actuator 17 may comprise any conventional construction and in one embodiment may comprise a single band, battery powered portable unit that generates a radio frequency signal when activated by, for example, depressing a switch or button located on a housing of the actuator 17. The radio frequency signal transmitted by the actuator 17 may be encoded with an identification code. The identification code may allow the signals received by the receiver 20 as being transmitted by an authorized actuator 17 thereby comprising an authorized signal. In one embodiment, the receiver 20 may determine whether the signal comprises an authorized signal by first decoding the received signal utilizing, for example, a decoder circuit and then determining whether the identification code contained therein matches an identification code stored in a memory portion of the receiver 20. If the START ENGINE signal received by the receiver 20 comprises an authorized signal, the controller 19 may cause the starter system 2 to be activated to thereby cause the engine 11 to be started as more fully described below. In one embodiment, the receiver 20 may transmit at least a portion of the decoded signal to the controller 19. The controller 19 may determine the type of signal received by the receiver 20 and any control actions required to be performed in response thereto.

With reference now to FIGS. 1, 2, 3a, and 3b, the controller 19 may determine the signal received by the receiver 20 comprises a START ENGINE signal and may cause the starter system 2 to be activated in order to cause the engine 11 to be started. Although a particular starter system is generally described, the remote starter system 10 may be utilized with any type of starter system suitable for starting an engine of a vehicle chosen with sound judgment by a person of ordinary skill in the art. Generally, the starter system 2 may comprise an engine controller or electronic control unit (ECU) 3, an ignition switch 4, a starter relay 5, a starter motor 6, and a battery 7. The ECU 3 may comprise a microprocessor, memory (volatile and non-volatile), a plurality of data bus lines, such as, for example, an address bus, a control bus, a data bus, and other hardware and software necessary for performing engine control as is well known in the art. The battery 7 may comprise a positive terminal and a negative terminal that may be utilized to provide power and a ground, respectively, to the ECU 3. The ignition switch 4 may comprise a multi-position switch that can be selectively actuated by the operator. The ignition switch 4 may be in electrical communication with the ECU 3 and the battery 7 such that actuation of the ignition switch 4 causes an electrical signal to be transmitted to the ECU 3. In one embodiment, the ignition switch 4 may comprise a multi-position switch that can be actuated between an OFF position for disabling predominately all of the electrical circuitry or devices of the vehicle 1; an ACCESSORY position for enabling the operation of select electronic circuitry, such as, for example, a radio and/or power windows; a RUN position for operating the vehicle 1; and a START position for causing an engine 11 to be started thereby allowing for the subsequent operation of the vehicle 1. In one embodiment, a mechanical ignition key 12 can be utilized to actuate the ignition switch 4 in order to start the engine 11 of the vehicle 1. The ignition key 12 may comprise a shaft portion 13 and a key head portion 14. The shaft portion 13 may be adapted to be inserted into a lock mechanism 9 such that the key head portion 14 can then be grasped and the lock mechanism 9 rotated to actuate the ignition switch 4. In one embodiment, the shaft portion 13 may be cut to operate a tumbler mechanism, not shown, positioned within the lock mechanism 9 as is well known in the art.

Figure 3A:
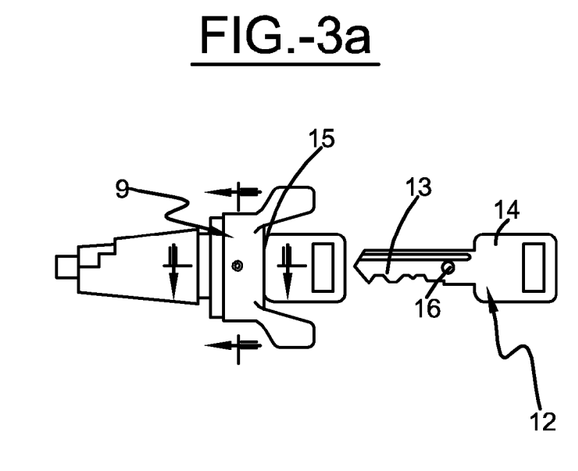
FIG. 3a shows an illustrative view of an ignition key having a pellet resistor and locking mechanism according to one embodiment of the invention.
Figure 3B:
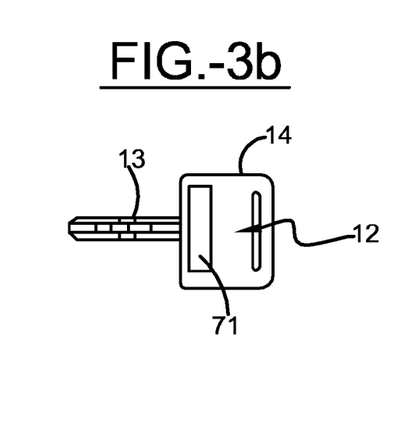
FIG. 3b shows an illustrative view of an ignition key having a transponder according to one embodiment of the invention.

With reference now to FIGS. 2, 3a, and 3b, in one embodiment, the shaft portion 13 of the ignition key 12 may be inserted into an opening 15 of the lock mechanism 9 and subsequently rotated to cause the ignition switch 4 to be positioned in the START position. The positioning of the ignition switch 4 in the START position may cause a first signal to be transmitted through the ignition switch 4 to the ECU 3 via a first ignition path 16. Upon receipt of the first signal, the ECU 3 may determine that the ignition switch 4 has been moved to the START position and may initiate a sequence for starting the engine 11. In one embodiment, the ECU 3 may first determine one or more operating conditions of the vehicle 1. For example, in one embodiment, the ignition system 2 may comprise a transmission sensor 3b for determining that the transmission, not shown, of the vehicle 1 is in "park" or "neutral" and/or an engine sensor 3a for determining that the engine 11 is not currently running. If the ECU 3 does not determine the existence of any operating conditions that would prevent the ECU 3 from causing the engine 11 to be started, the ECU 3 may cause power from the battery 7 to be provided to the starter relay 5 thereby causing the starter motor 6 to be energized and the engine 11 subsequently started as is well known in the art.

With reference now to FIGS. 1 and 2, in one embodiment, upon determining that the received signal comprises a START ENGINE signal, the controller 19 may cause the starter system 2 to be activated by causing an ignition signal to be transmitted to the ECU 3 of the starter system 2. The ignition signal may cause the ECU 3 to determine that the ignition switch 4 has been positioned in the START position. In a more specific embodiment, the controller 19 may transmit the ignition signal to the starter system 2 by activating an ignition power output 38 and a starter output 40. The ignition power output 38 may be in electrical communication with the battery 7 and the ignition switch 4. Activation of the ignition power output 38 may cause power to be provided to the starter system 2 in a manner similar to that of the ignition switch 4 being positioned in the RUN position. The starter output 40 may be in electrical communication with the battery 7 and the ignition switch 4. Activation of the starter output 40 may cause power to be provided to the starter system 2 and the starter motor 6 in a manner similar to that of the ignition switch 4 being positioned in the START position. The controller 19 may then determine that the engine 11 has been started and may deactivate the starter output 40 and may cause the ignition power output 38 to remain activated thereby allowing the engine 11 to continue to operate. The controller 19 may cause the deactivation of the ignition power output 38 upon determining the expiration of a predetermined period of time or upon determining the occurrence of a predetermined condition, such as, for example, the receipt of a STOP ENGINE signal by the receiver 20, the depression of the brake pedal, the opening of the hood, and any other predetermined condition chosen with sound judgment by a person of ordinary skill in the art. The deactivation of the ignition power output 38 may cause the starter system 2 to operate as determined by the current position of the ignition switch 4. For example, if the ignition switch 4 is positioned in the RUN position, the ignition switch 4 may cause power to be supplied to the starter system 2 thereby allowing the engine 11 to continue to run or operate. If the ignition switch 4 is positioned in the OFF position, the deactivation of the ignition power output 38 may prevent power from being provided to the starter system 2 thereby terminating the operation of the engine 11.

Figure 5:
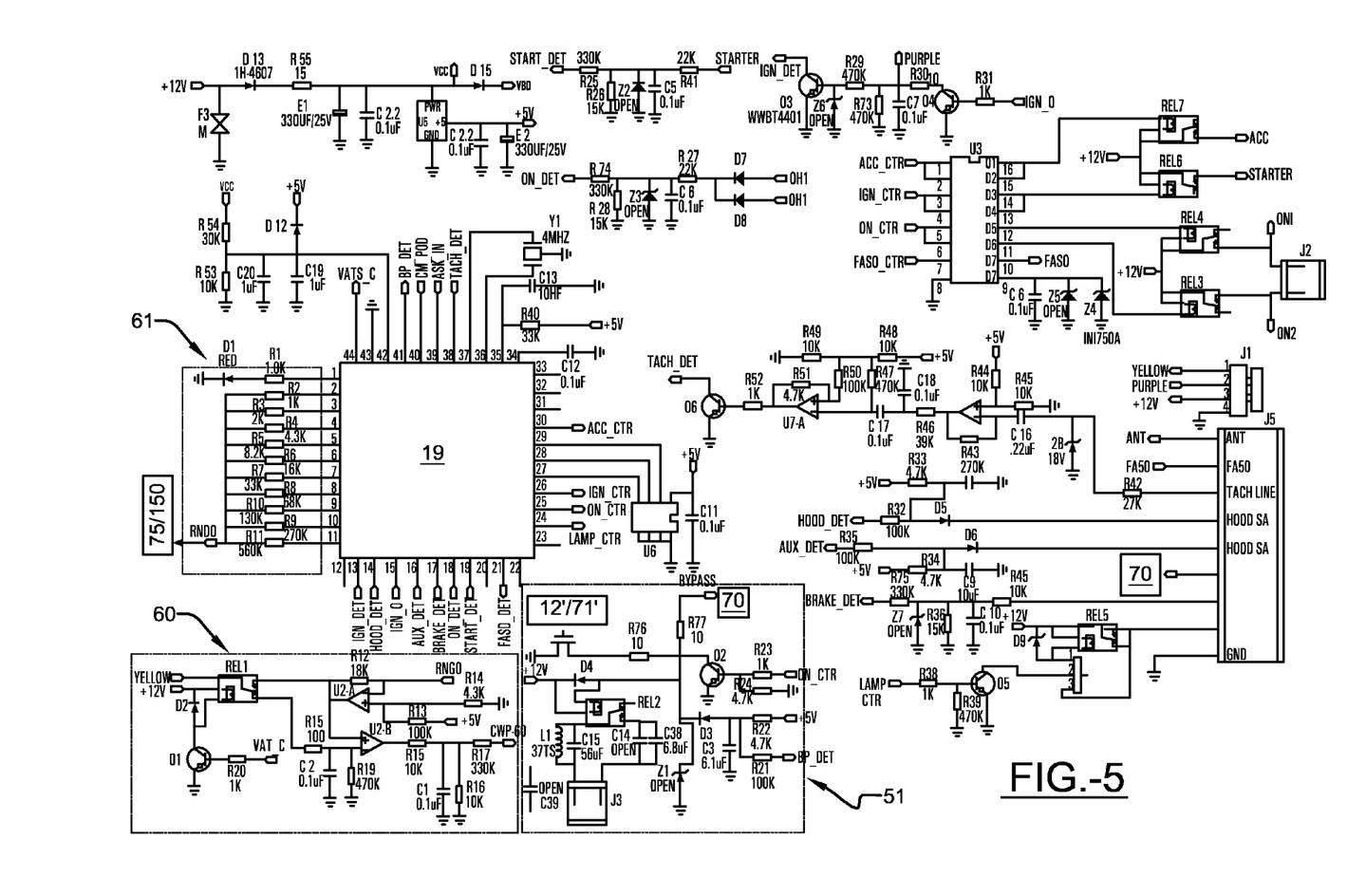
FIG. 5 shows a schematic view of a remote starter system having a universal bypass module according to one embodiment of the invention.
Figure 6:
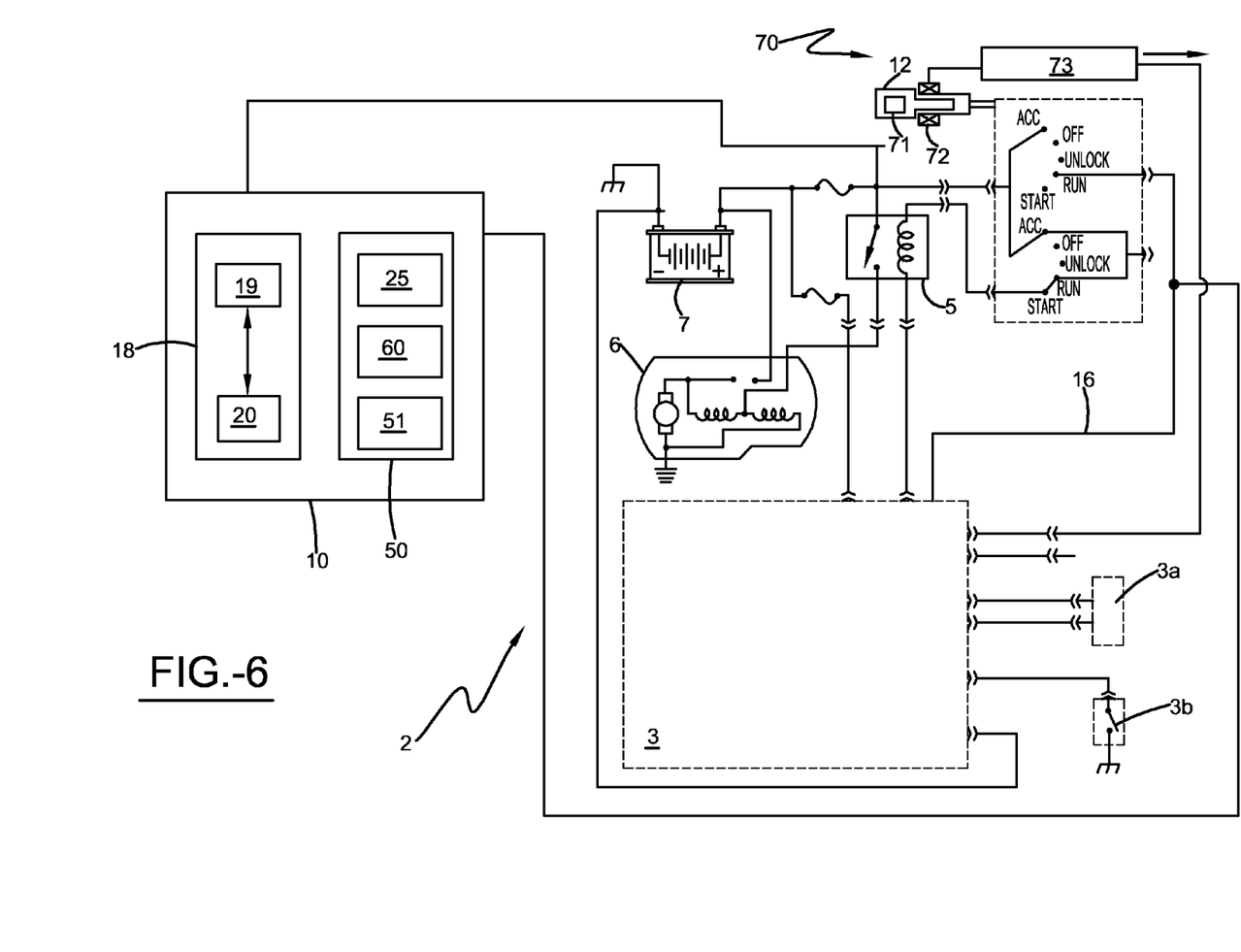
FIG. 6 shows an illustrative schematic view of a remote starter system operatively connected to a transponder-based vehicle security system according to one embodiment of the invention.

With reference now to FIGS. 1, 2, and 5, the bypass module 50 may comprise a device for enabling the remote starting of the engine 11 wherein the vehicle 1 is equipped with a vehicle security system, such as, for example, a transponder-based vehicle security system 70 or a resistance-based vehicle security system 75 as more fully described below. The bypass module 50 may be positioned substantially within the housing 21 and may be electrically coupled to the starter module 18. In another embodiment, the remote starter system 10 may comprise a kit that can be sold as a single retail unit wherein the starter module 18 is positioned substantially within the first housing 21 and the bypass module 50 is positioned substantially within a second housing 27. The bypass module 50 may comprise a transponder module 51, a resistance module 60, and a first switching mechanism 25. The first switching mechanism 25 may be adapted to selectively electrically couple the bypass module 50, or a portion thereof, to the starter system 2. In one embodiment, the first switching mechanism 25 may comprise a normally open switch or relay that can be controlled by the controller 19 to selectively cause the bypass module 50 to be in electrical communication with the starter system 2 and/or any installed vehicle security system. In another embodiment, the first switching mechanism 25 may be implemented utilizing control circuitry and executable commands stored in the memory of the controller 19 as is well known in the art. The first switching mechanism 25 may comprise any device or means that can be controlled to cause at least a portion of the bypass module to be selectively electrically coupled to a component of the vehicle 1 chosen with sound judgment by a person of ordinary skill in the art. In one embodiment, the actuation of the first switching mechanism 25 may cause the transponder module 51 and the resistance module 60 to be in electrical communication with the starter system 2 and/or the vehicle security system thereby eliminating the requirement for the user to determine the type of security system, if any, installed on the vehicle 1. In another embodiment, the controller 19 may determine the type of vehicle security system, if any, installed on the vehicle 1 and may control the first switching mechanism 25 to cause the transponder module 51 or the resistance module 50 to be in electrical communication with the starter system 2 and/or the vehicle security system.

With continued reference now to FIGS. 1, 3b, 5, and 6, the transponder module 51 may comprise a device adapted to at least partially enable the remote starter system 10 to remotely start the engine 11 of the vehicle 1 wherein the vehicle 1 comprises the transponder-based vehicle security system 70. As vehicles comprising transponder-based vehicle security systems are well known in the art, the transponder-based vehicle security system 70 is only generally described herein. A transceiver or a transponder 71 may be embedded or positioned within the key head portion 14 of the ignition key 12. The transponder 71 may comprise a radio-frequency receiving-transmitting antenna, power storage capacitor, and a CMOS ASIC programmed with a security algorithm or other identification means, all encapsulated within a glass cylinder, as is well known in the art. A radio-frequency (RF) transmitter-receiver or transceiver 72 may be positioned adjacent to or in proximity with the lock mechanism 9. As the shaft portion 13 of the ignition key 12 is inserted into the lock mechanism 9 and the lock mechanism 9 is rotated to cause the ignition switch 4 to comprise the RUN position, power may be supplied to the transceiver 72 to generate an RF field. The generation of the RF field by the transceiver 72 may cause the storage capacitor of the transponder 71 to be charged. The energy so received by the transponder 71 may be used to generate a security code or other type of identification signal which may be transmitted back to the transceiver 72 wherein a vehicle security controller 73 may verify that the data is valid and/or corresponds with data stored in a memory portion of the vehicle security controller 73. If the data is verified, then the vehicle security controller 73 may cause an enabling action to occur, such as, for example, causing a signal to be transmitted to a fuel pump controller to enable the fuel pump, not shown, of the vehicle 1, and subsequently allow the engine 11 to be started in a conventional manner. If the data is not verified, then the vehicle security controller 73 does not cause the enabling action to occur thereby preventing the engine 11 from being started.

With continued reference to FIGS. 1, 3b, 5, and 6, prior to utilizing the remote starter 10 to remotely start the engine 11 of the vehicle 1, the transponder module 51 may require that a second ignition key 12' comprising a second transponder 71' adapted to enable the starting of the engine 11 be in electrical communication with the transponder module 51 such that the transponder module 51 can be controlled to allow the second ignition key 12' to selectively be in electrical communication with the transponder-based vehicle security system 70. In one embodiment, the second ignition key 12' may be coupled to the transponder module 51 such that the transponder of the second ignition key 12' is positioned through the loop formed by a multi-turn coil 52. In one embodiment, the transponder module 51 comprises a buckle assembly 54 for coupling the second ignition key 12' to the transponder module 51. The buckle assembly 54 may comprise a latch 55 pivotally connected to a portion of the transponder module 51. The second ignition key 12' may be positioned through the loop formed by the multi-turn coil 52 such that a biasing member 56 may urge the latch 55 against the second ignition key 12' thereby causing the second ignition key 12' to remain positioned through the loop formed by the multi-turn coil 52. In another embodiment, the second ignition key 12' may be fixedly positioned to a circuit board, not shown, utilizing a conventional adhesive or fastener as is well known in the art. The multi-turn coil 52 may be in electrical communication with a loop connector 53. The loop connector 53 may extend from the transponder module 51 and may be positioned around or adjacent to the lock mechanism 9 and/or the ignition switch 4. The first switch mechanism 25 may be positioned between the loop connector 53 and the multi-turn coil. The first switch mechanism 25 may comprise a normally open switch or relay that can be controlled by the controller 19 to selectively couple the loop connector 53 and the multi-turn coil 52 thereby allowing for the selective bypassing of the transponder-based vehicle security system 70.

With continued reference to FIGS. 1, 3b, 5, and 6, upon determining that the received signal comprises a START ENGINE signal, the controller 19 may cause the transponder module 51 to be in electrical communication with the starter system 2 thereby allowing the second transponder 71' of the second ignition key 12' to provide the necessary identification or security code to the transponder-based security system 70 thereby allowing the engine 11 to be remotely started. In one embodiment, the controller 19 may cause the transponder module 51 to be in electrical communication with the starter system 2 by actuating the first switching mechanism 25 thereby causing the loop connector 53 to be in electrical communication with the multi-turn coil 52. The activation of the starter output 40 by the controller 19 may cause the ECU 3 to cause power to be supplied to the transceiver 72 thereby generating an RF field. The generated RF field by the transceiver 72 may cause current to be induced in the loop connector and transmitted to the second transponder 71' via the multi-turn coil 52 thereby causing the storage capacitor of the second transponder 71' to be charged. The charging of the second transponder 71' may cause a security code or other type of identification signal to be generated and subsequently back to the transceiver 72 via the multi-turn cable 52. The transceiver 72 may transmit the security code or other type of identification signal to the vehicle security controller 73 thereby allowing the engine 11 to be remotely started.

With reference now to FIGS. 1, 2, 3a, 5, and 7, the resistance module 60 may comprise a device adapted to at least partially enable the remote starter system 10 to remotely start the engine 11 of the vehicle 1 wherein the vehicle 1 comprises the resistance-based vehicle security system 75. Generally, the resistance-based vehicle security system 75 may utilize a pellet resistor 76 positioned within the shaft portion 13 of the ignition key 12 to provide a predetermined resistance that must be present to allow the engine 11 to be started. The insertion of the shaft portion 13 into the opening 15 of the lock mechanism 9 may cause the pellet resistor 76 to be engaged by two or more contacts 77 positioned within the lock mechanism 9. The contacts 77 may cause the pellet resistor 76 to be in electrical communication with a decoder circuit 78. The decoder circuit 78 may comprise first, second, and third input terminals 102, 103, 104 and an output terminal 105. The third input terminal 104 may be in electrical communication with the vehicle battery 7 through the ignition switch 4. The movement of the ignition switch 4 to the START position may cause a voltage divider 109 to be in electrical communication with the battery 7 such that a reduced voltage is provided to an inverting input of a first and second amplifiers 112, 113 of a latch circuit 114. The latch circuit 114 may control an output transistor 115 having its emitter collector path connected to a magnetic pickup coil of the starter relay 5 via the output terminal 105. When the output transistor 115 is rendered conductive the pickup coil 117 is grounded through the emitter collector path and the starter system 2 is rendered inoperative.

Figure 7:
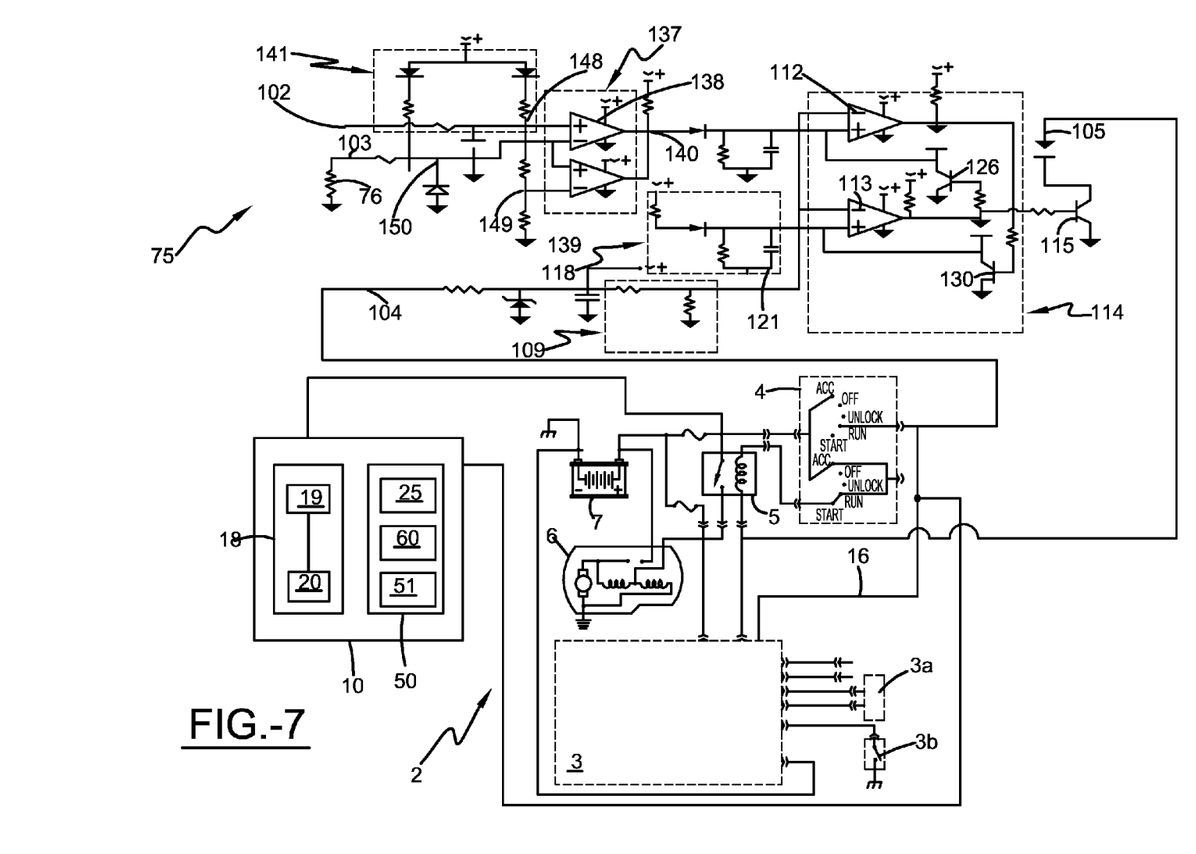
FIG. 7 shows an illustrative schematic view of a remote starter system operatively connected to a resistance-based vehicle security system according to one embodiment of the invention.

With reference now to FIG. 7, the movement of the ignition switch 4 to the START position may also cause a timing circuit 118 to be in electrical communication with the battery 7. The timing circuit 118 may normally apply ground to the non-inverting input of the second amplifier 113 so that the output of the second amplifier 113 is low when the ignition switch 4 is initially closed. Upon the expiration of a predetermined period of time following the closure of the ignition switch 4 a capacitor 121 of the timing circuit 118 may charge above the threshold of the voltage at the non-inverting input of the second amplifier 113 and cause the output of the second amplifier 113 to switch to a high state. The base electrode of output transistor 115 may be in electrical communication with the output of the second amplifier 113 and the battery 7 such that when the output of the second amplifier 113 goes high the output transistor 115 is turned on. The output of the second amplifier 113 may also be applied to the base of a transistor 126 such that when the output of the second amplifier 113 is switched high, the transistor 126 may be turned on and may apply ground potential to the non-inverting input of the first amplifier 112 to ensure that the output of the first amplifier 112 remains in a low state. Therefore, movement of the ignition switch 4 to the START position may cause the latch circuit 114 to be switched to a state where the output of first amplifier 112 is low and the output of second amplifier 113 thereby disabling the starter system 2.

With reference now to FIGS. 1, 2, 3a, 5, and 7, to allow the enabling of the starter system 2, the insertion of the shaft portion 13 of the correct ignition key 12 may cause the pellet resistor 76 to be in electrical communication with a bridge network 141 at the second input terminal 103. The bridge network 141 may be in electrical communication with a window detector 137 having its output connected to a junction 140. A voltage divider may establish an upper voltage limit of the window detector 137 at the junction 148 connected with the non-inverting input of the third amplifier 138 and a lower voltage limit at the junction 149 connected with the inverting input of the fourth amplifier 139. The pellet resistor 76 may, upon insertion of the ignition key 12, establish a voltage at junction 150. Junction 150 may be connected with the inverting input of the third amplifier 138 and the non-inverting input of the fourth amplifier 139. If the correct ignition key 12 is utilized, the value of the pellet resistor 76 will be such that the voltage established at the junction 150 is within the upper and lower voltage limits established by the window detector 137 and the output of both the third and fourth amplifiers 138, 139 will be driven high thereby causing the output of the first amplifier 112 of the latch circuit 114 to be high. The high output of the first amplifier 112 also turns on transistor 130 which grounds the non-inverting input of the second amplifier 113 ensuring that the output of the second amplifier 113 is low so that the output transistor 115 is non-conductive and the starter system 2 is enabled.

With continued reference to FIGS. 1, 2, 3a, 5, and 7, prior to utilizing the remote starter system 10 to remotely start the vehicle 1 comprising the resistance-based vehicle security system 75, the resistance module 60 may be required to "learn" the resistance necessarily provided to cause the resistance-based vehicle security system 75 to allow the engine 11 to be started. The resistance module 60 may learn the resistance provided by a pellet resistor 76 positioned with the shank portion 13 of the ignition key 12 as the ignition key 12 is utilized to move the ignition switch 4 to the START position. In one embodiment, the resistance module 60 may comprise a digital volt ohm meter and a resistance circuit 61 for learning and subsequently providing the resistance suitable for causing the resistance-based vehicle security system 75 to allow the engine 11 to be started. The resistance module 60 may learn the resistance by utilizing the digital volt ohm meter, or equivalent electronic circuitry, to determine the voltage and/or current present at a predetermined junction as the ignition 12 is utilized to move the ignition switch 4 to the START position. The resistance module 60 or the controller 19 may utilize the voltage or current values determined by the digital volt ohm meter to determine the resistance provided by the pellet resistor 76, referred to hereinafter as the "learned resistance", and may cause the resistance circuit 61 to be configured to provide the learned resistance when remotely starting the engine 11 as further described below. In one embodiment, the resistance circuit 61 may comprise one or more variable resistors that can be controlled to provide the learned resistance. In another embodiment, the resistance circuit 61 may comprise a plurality of resistors and switching mechanisms, such as, for example, switches and/or relays. The resistors and switching mechanisms may be electrically coupled such that one or more switching mechanisms can be controlled (opened or closed) thereby causing the resistance circuit 61 to be configured to provide the learned resistance. The first switching mechanism 25 may be positioned between the resistance circuit 61 and the resistance-based vehicle security system 75. The first switching mechanism 25 may comprise a normally open switch or relay that can be controlled by the controller 19 to selectively couple the resistance circuit 61 and the resistance-based vehicle security system 75 thereby allowing for the selective bypassing of the resistance-based vehicle security system 75.

With continued reference to FIGS. 1, 2, 3a, 5, and 7, upon determining that the received signal comprises a START ENGINE signal, the controller 19 may cause the resistance module 60 to be in electrical communication with the starter system 2 thereby allowing the resistance circuit 61 to provide the learned resistance to the resistance-based security system 75 thereby allowing the engine 11 to be remotely started. In one embodiment, the controller 19 may actuate the first switching mechanism 25 to cause the resistance module 60 to be in electrical communication with the starter system 2. The actuation of the first switching mechanism 25 may cause the resistance circuit 61 to be in electrical communication with the window detector 137 such that the resistance provided by the resistance circuit 61 causes the voltage at the junction 150 to be within the upper and lower voltage limits established by the window detector 137 thereby causing the output of both the third and fourth amplifiers 138, 139 and the output of the first amplifier 112 to be driven high. The high output of the first amplifier 112 may cause the transistor 130 to be turned on. The turning on of the transistor 130 may cause the non-inverting input of the second amplifier 113 to be grounded thereby ensuring that the output of the second amplifier 113 is low so that the output transistor 115 is non-conductive and the starter system 2 is enabled.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A remote starter system comprising:
a receiver for receiving wireless signals;
a controller electrically coupled to the receiver and a starter system of an associated vehicle, wherein the controller is adapted to provide power to the starter system to start an engine of the associated vehicle in response to a first signal being received by the receiver; and,
a bypass module adapted to enable the remote starter system to be utilized to start the engine of the associated vehicle wherein the associated vehicle comprises a transponder-based vehicle security system and to start the engine of the associated vehicle wherein the associated vehicle comprises a resistance-based vehicle security system, the bypass module is in electrical communication with the controller, and the controller controls a first switching mechanism to selectively electrically couple the bypass module to the starter system.

2. The system of claim 1, further comprising a transponder module component configured to couple with at least a vehicle ignition transponder component of a vehicle key used to start said engine of the associated vehicle, wherein said vehicle ignition transponder component is used to bypass said transponder-based vehicle security system in the associated vehicle.

3. The system of claim 2, said transponder module component configured to enable at least a portion of said vehicle key to be in electrical communication with said transponder-based vehicle security system.

4. The system of claim 1, further comprising a resistance module component configured to learn a security resistance used to bypass said resistance-based vehicle security system in the associated vehicle, thereby enabling starting of said engine.

5. The system of claim 4, said resistance module component comprising one or more of:
a volt ohm determination component configured to determine said security resistance used to bypass said resistance-based vehicle security system; and
one or more variable resistor components configured to provide said security resistance used to bypass said resistance-based vehicle security system.

6. The system of claim 1, further comprising a housing component, wherein said receiver, said controller and said bypass module are positioned substantially within said housing, and said housing is configured to facilitate installation of the system on the associated vehicle.

7. The system of claim 1, further comprising:
a starter housing configured to comprise the said receiver and said controller; and
a universal bypass module housing configured to comprise:
a transponder module component configured to couple with at least a vehicle ignition transponder component of a vehicle key used to start said engine of the associated vehicle, wherein the vehicle ignition transponder component is used to bypass said transponder-based vehicle security system in the associated vehicle; and
a resistance module component configured to learn a security resistance used to bypass said resistance-based vehicle security system in the associated vehicle, thereby enabling starting of said engine of the associated vehicle.

8. The system of claim 1, further comprising an actuator component configured to transmit a wireless signal configured to be received by said receiver, said wireless signal comprising one or more of:
said first signal; and
a second signal configured to direct said controller to initiate stopping of said engine.

9. The system of claim 8, said actuator component further configured to transmit a security-based wireless signal, said security-based wireless signal comprising an identification code configured to identify an authorized actuator component.

10. The system of claim 1, the controller configured to perform one or more of:
determine whether a vehicle security system is installed in the associated vehicle; and
if a vehicle security system is installed, identify whether said vehicle security system comprises one or more of:
said transponder-based vehicle security system; and
said resistance-based vehicle security system.

11. A universal bypass module comprising:
a resistance module adapted to learn the resistance necessary to enable the starting of an engine of an associated vehicle wherein the associated vehicle comprises a resistance-based vehicle security system;
a transponder module adapted to retain an ignition key designed to start the engine of the associated vehicle wherein the associated vehicle comprises a transponder-based vehicle security system;
a controller for selectively coupling the universal bypass module to the ignition system of the associated vehicle and,
a housing, wherein the controller, the resistance module, and the transponder module are positioned substantially within the housing and the housing at least partially facilitates the installation of the universal bypass module on the associated vehicle.

12. The system of claim 10, the controller further configured to activate said first switching mechanism to electrically couple:
said starter system to a transponder module component configured to couple with at least a vehicle ignition transponder component of a vehicle key used to start said engine of the associated vehicle, if said transponder-based vehicle security system is installed in the associated vehicle; and
said starter system to a resistance module component configured to learn a security resistance used to bypass said resistance-based vehicle security system in the associated vehicle, if said resistance-based vehicle security system is installed in the associated vehicle.

13. The universal bypass module of claim 11, further comprising a first switching component configured to selectively electrically couple a starter system of the associated vehicle with one or more of:
said resistance module; and
said transponder module.

14. The universal bypass module of claim 13, said controller configured to control said first switching component to selectively couple the universal bypass module to said ignition system of the associated vehicle.

15. The universal bypass module of claim 11, further comprising a receiver component configured to perform one or more of:
receive a wireless signal from an actuator component; and
notify said controller when an authorized wireless signal has been received.

16. The universal bypass module of claim 11, said transponder module configured to enable at least a portion of said vehicle key to be in electrical communication with said transponder-based vehicle security system.

17. The universal bypass module of claim 11, said resistance module comprising one or more of:
a volt ohm determination component configured to determine said security resistance used to bypass said resistance-based vehicle security system; and
one or more variable resistor components configured to provide said security resistance used to bypass said resistance-based vehicle security system.

18. A kit comprising:
a starter module comprising a receiver and a controller positioned within a first housing and adapted to remotely start an engine of an associated vehicle; and,
a universal bypass module positioned within a second housing and electrically coupled to the remote starter, wherein the bypass module comprises:
a resistance module adapted to learn and provide the resistance necessary to enable the starting of the engine of the associated vehicle, wherein the vehicle comprises a resistance-based vehicle security system; and
a transponder module adapted to provide an identification code necessary to start the engine of the associated vehicle, wherein the associated vehicle comprises a transponder-based vehicle security system.

19. The kit of claim 18, further comprising an actuator component configured to transmit a wireless signal configured to be received by said receiver, said wireless signal comprising one or more of:
a first signal configured to direct said controller to initiate starting of said engine; and a second signal configured to direct said controller to initiate stopping of said engine.

20. The kit of claim 18, further comprising a first switching component configured to selectively electrically couple a starter system of the associated vehicle with one or more of:

said resistance module; and
said transponder module.

* * * * *